K. K. CARR.
CORN PLANTER.
APPLICATION FILED DEC. 1, 1910.
1,052,459.
Patented Feb. 11, 1913.
3 SHEETS—SHEET 1.
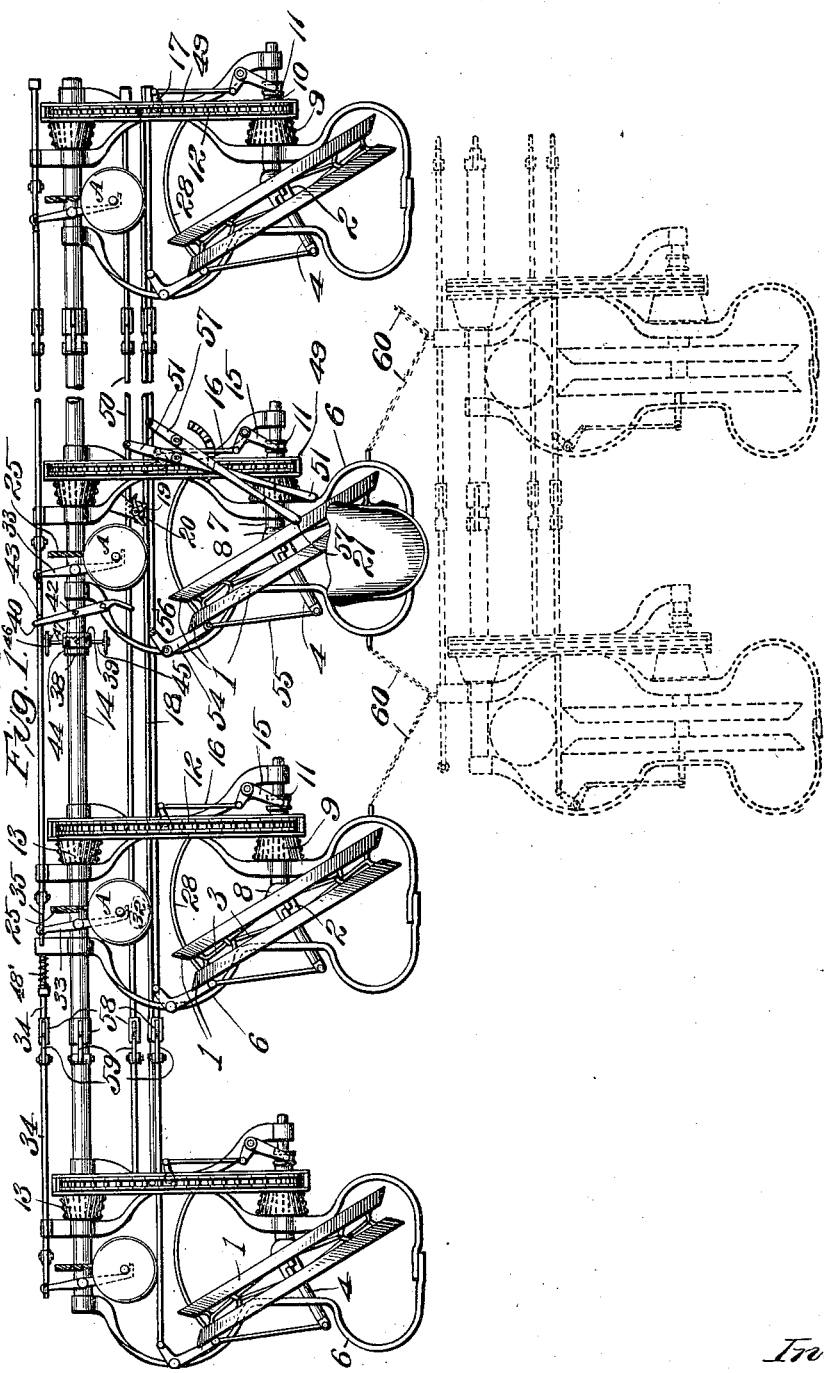

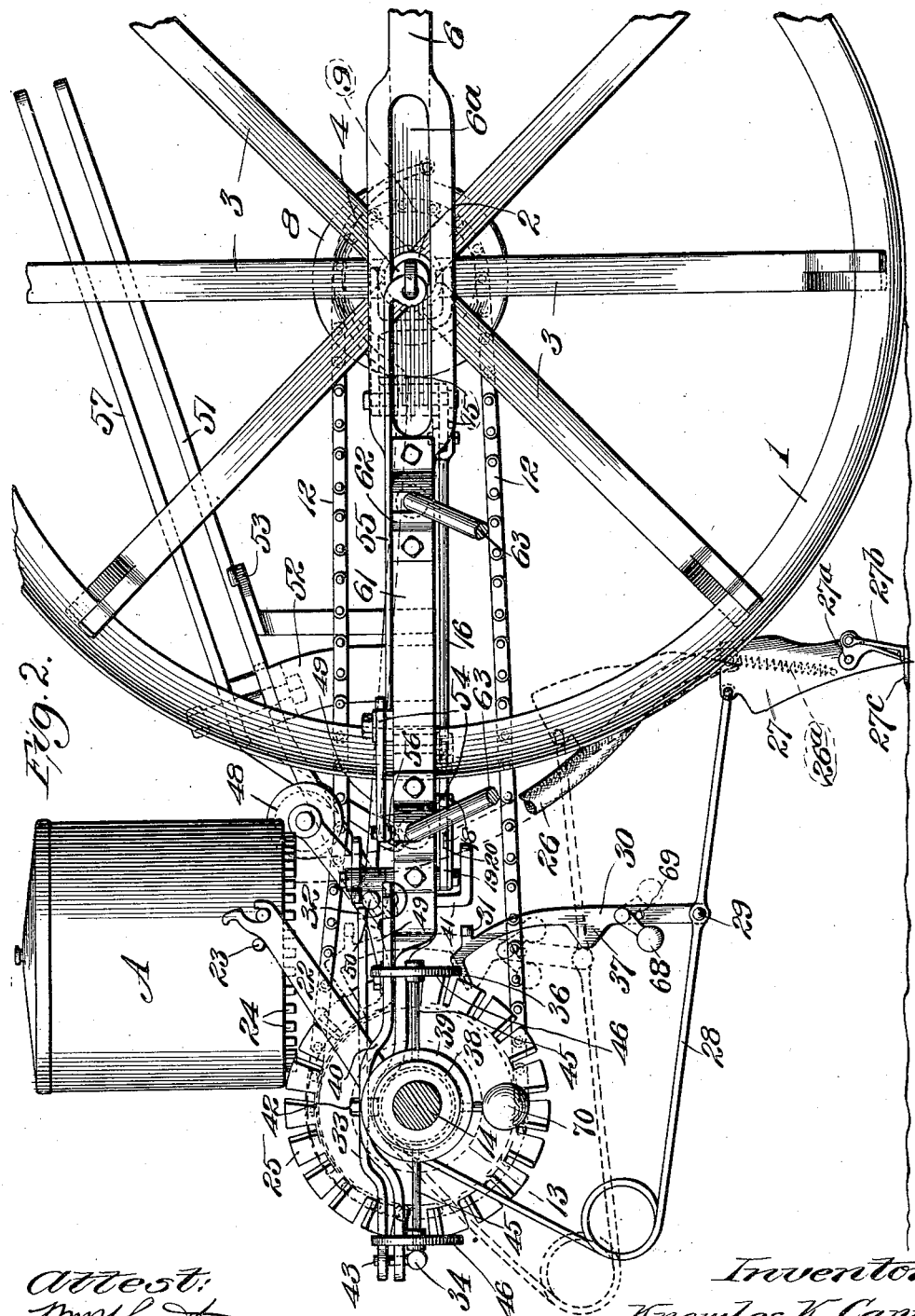

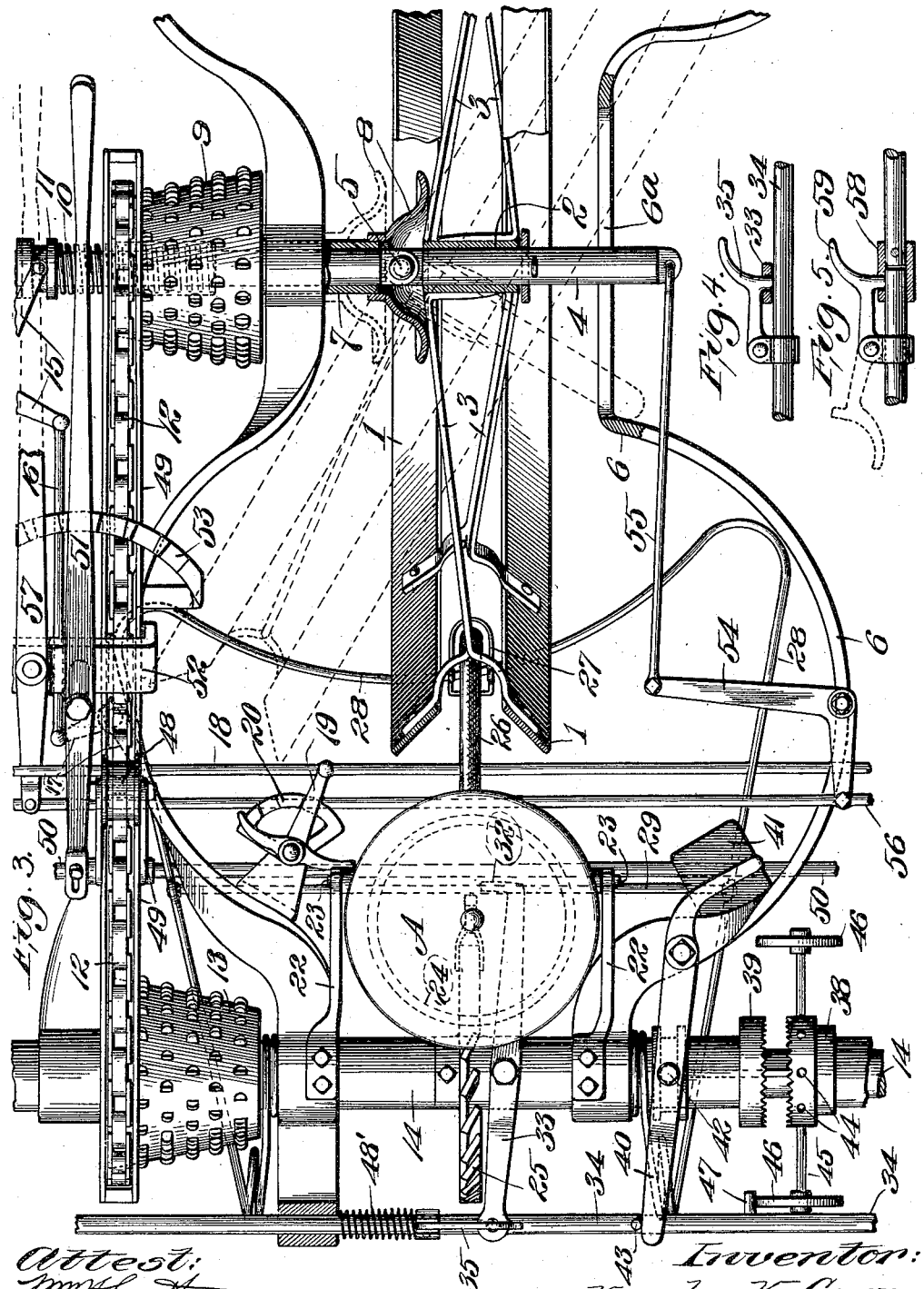

UNITED STATES PATENT OFFICE.

KNOWLES K. CARR, OF ST. LOUIS, MISSOURI.

CORN-PLANTER.

1,052,459.  Specification of Letters Patent.  Patented Feb. 11, 1913.

Application filed December 1, 1910. Serial No. 595,142.

*To all whom it may concern:*

Be it known that I, KNOWLES K. CARR, a citizen of the United States, residing at St. Louis, Missouri, have invented a new and useful Corn-Planter, of which the following is a specification.

This invention relates to corn planters, and one of the principal objects is to provide a planter composed of a plurality of planting sections or units which are capable of being united or coupled together side by side; and which may be separated from their side by side arrangement and connected together in entrained relation so as to be conveniently moved over roads, highways, bridges, etc., while being moved from one place or field to another.

Another object is to equip the machine with improved planting mechanism including seed conveyers which are supported out of contact with the ground, and are driven into the ground intermittently so as to convey into the soil and cover over the seed. This arrangement and operation makes the machine of lighter draft and permits the use of a greater number of planting units or sections than can be used in planting machines which employ runners and channels for conveying the seed grain into the ground.

While I have mentioned a number of objects of this invention, there are many others which do not require specific mention but which will become obvious from the following description and the annexed drawings in which I have shown one embodiment of the invention, and in which—

Figure 1 is a plan view of a planting machine embodying my invention, the dotted lines showing the end sections or units entrained to the middle sections for conveyance along highways, etc. Fig. 2 is a side elevation of one of the planting sections. Fig. 3 is a plan view, the wheel being in section. Fig. 4 is a detail view of a pawl which locks a lever in position. Fig. 5 is a detail view of one of the coupling devices by which the planter sections or units are held together in their side by side adjustment.

The machine is supported by wheels 1 each of which consists of two rings arranged as shown, and connected with a hub 2 by spokes 3. The rings are of thin metal and are spaced apart so that the felly of each wheel is really composed of two rings. The periphery of each of said rings is beveled or oblique, and they are inclined inwardly so that the soil will be compressed to cover the seed deposited within the soil in front of the wheels. The wheels are mounted on axles 4 each of which is composed of two parts, the said parts of each axle being hinged together as shown at 5, Fig. 3. Each of the axles supports a frame 6 in one side of which is a slot $6^a$ in which the movable end or part of the axle extends. The opposite end of each axle is mounted in the side of the frame and is encircled by a sleeve 7. The sleeve has a friction disk 8 in contact with the spokes 3, so that the wheel will rotate the sleeve. A conical cylinder 9, provided with rows or series of teeth on its periphery, is secured to the sleeve. Said sleeve is actuated toward the wheel by a spring 10 encircling the axle and pressing against the end of the sleeve. A collar 11 constitutes a slidable abutment for the spring whereby tension of the spring may be varied effectively to bind or release the sleeve and sprocket wheel 9.

As stated above the planter consists of several independent planting units or sections, and each unit is supported on a wheel, so that the description of one section or unit applies to all alike except as otherwise explained.

In Fig. 3 one of these units or sections is illustrated. A sprocket chain 12 communicates motion from the wheel 9 to a similar wheel 13 secured upon a shaft 14 which, in the present instance, extends across in front of three sections or planter units. The wheels 9 and 13 are oppositely arranged, so that by moving the sprocket chain from one row or series of teeth on said wheels to other rows or series of teeth thereon, the speed of rotation of the shaft 14 will be varied, and this may be effected in any desired limits. The purpose of this arrangement is to enable the user of the machine to plant the grain in any desired relation, whether close together, or in places far apart as in "checking." By adjusting the chain on the large periphery of the wheel 9 and on the small periphery of the wheel 13 the shaft 14 will be rotated rapidly, and vice versa. The shaft 14 controls the grain delivery or planting devices, so that grain will be planted in conformity with the rotation of the shaft 14. The shaft 14 is journaled in the front ends of the frames 6. In order to cause the wheel 9 to be driven by the supporting wheel it is necessary to compress the spring 10 so as to hold the disk 8 against the spokes of the wheel. Lever devices are used for this purpose. The bell-crank lever 15 (Figs. 1 and 3) engages in a groove in the collar 11. A link 16 connects the lever 15 with a lever 17, the opposite arm of said lever 17 in each planting unit or section being connected to a sliding rod 18 lateral movement of which will cause the collar 11 to compress or release the spring 10. A lever 19 (Fig. 3) has one arm pivoted to the rod 18, and has two lateral arms to be engaged for the purpose of operating said lever. The lever 19 operates on a latch member 20 whereby it will be held in either of its two adjustments so as to hold the spring 10 under compression or free. This lever 19 is in the same planting unit or section occupied by the driver or user of the machine. A seat 21 is arranged in this section (Fig. 1) for the use and support of the driver, and the lever 19 is mounted in position for convenient manipulation by the foot of the driver.

The hopper or grain box A in each section is pivotally supported on two arms 22 which engage with pins 23 on the hopper or box. These pins constitute pivots so that the hopper or box may be supported vertically as shown in Fig. 2, or may be tilted to oblique position. The delivery devices in the box whereby the grain is released into the passage which carries it into the ground are of usual or well known construction and arrangement and are operated step by step, as usual. The lower delivery plate which, as usual, rotates step by step has an annular series of teeth 24. These teeth are engaged successively by the oblique or inclined teeth of a wheel 25 on the shaft 14, so that when said shaft 14 is driven, the planting mechanism will be operated. As stated above, however, the hoppers or boxes may be moved to inclined or oblique adjustment which will disengage the teeth 24 from the wheels 25, and will permit the wheels 25 to operate without operating the planting mechanism. Since each box or hopper is capable of being disengaged independently of the others, the operator is enabled to throw out of use any desired number of planting sections without rendering all of them idle.

The grain is delivered from the hopper or box into a flexible tube or passage 26. Each tube or passage 26 leads to a hoe or furrow opener 27 which is slidably carried on an arcuate portion of a spring-frame or drag bar 28 supported on the shaft 14. The tube is connected to the hoe by a spring 26$^a$ which constitutes a yielding or elastic connection enabling the parts automatically to adjust themselves to different requirements.

The hoe is in the form of a pointed box or tube, with the small end down, and having an opening at the lower end for the egress of the grain. A valve 27$^a$ closes the opening and holds the grain till the proper time for discharging arrives. Two arms 27$^b$ are pivoted to the valve and carry an arcuate foot piece 27$^c$ which strikes the ground and opens the valve each time the hoe is driven into the ground. The ends of the piece 27$^c$ extend beyond the track made by the wheels which follow, and make depressions or imprints which indicate the exact location of the various "hills" or deposits of grain. The tendency of the frame 28 is to actuate or drive the hoe 27 into the ground. A rod 29 joins the two arms of the spring-frame 28 and supports an arm 30 which has a hook 31 on its upper end. Said hook 31 is arranged to engage over a lateral extension 32 on the rear end of a lever 33 which is pivoted to a non-rotatable sleeve on the shaft 14. The front end of the lever 33 rests on a rod 34 and may be latched to the rod by a latching hook 35 (Fig. 4) adapted to engage in a hole in the lever, but the hoe 27 may be supported and retained as long as desired above the ground in the position shown by dotted lines in Fig. 2 by engaging the hook 31 over the end of the lever 33. Should the hook 31 be disengaged from engagement with the lever 33 the tension of the spring-frame 28 will drive the hoe into the ground, and this operation is effected intermittently so as to make the delivering strokes and plant the grain at proper distances apart. The operation of the planting hoe is controlled by the shaft 14 and the wheel 25. The hoe is raised after each stroke by the wheel 25 engaging a hook 36 on the arm 30 and lifting said hook and the frame 28 until the hook 31 is above the extension 32 of the lever 33 at which time the arm 30 is pushed away from the wheel 25 by the shoulder 37 on said arm. The hook 31 then catches on the extension of the lever 33. The lever 33 is suitably controlled and operated so as to release the hook 31 and permit the frame 28 to operate. A clutch member 38 (Fig. 3) is loose on the shaft 14, the other clutch member 39 being splined on the shaft and slidable thereon. A lever 40 is pivoted to the frame 6 near the foot rest 41 so as to be in a convenient position for operation. Said lever has a pin 42 in a groove in a part of the clutch member 39 so that said clutch member may be moved into or cut of engagement with the member 38. The lever 40 extends alongside of a pin 43 on the rod 34. The clutch member 38 has a series of holes 44 adapted to receive the ends of rods 45. The rods 45 carry plates 46 on their free ends. A pin 47 on the rod 34 will be engaged by the plates 46 as the clutch member 38 rotates. This action intermittently moves the rod 34 laterally sufficient to release the arm 30 from the lever 33 and permit the hoe 27 to be driven into the ground to deposit the seed. The frequency of the operation of the hoe will, of course, depend upon the number of the rods 45 which are attached to the clutch member 38, and there may be any number desired. The rod 34 is actuated in one direction by a spring 48' and is thereby automatically restored to idle position after each movement by the clutch devices.

From the foregoing it is plain that the speed of operation of the planting devices in the boxes or hoppers A may be varied to conform to varying requirements by adjusting the chain 12 in proper position on the conical sprocket wheels 9 and 13. The wheels 25 which are driven with the shaft 14 operate the planting mechanism of the hoppers in conformity with the rotation of the said shaft 14. It is also plain that the speed of operation of the planting hoe 27 may be varied to conform to the varying demands independently of any adjustment of the chain 12, this being accomplished by use of a larger or less number of the rods 45 on the clutch member. The chain 12 may be conveniently moved to its different adjustments on the sprocket wheels. An idle wheel 48 rides on each chain, said wheels being carried by pairs of arms 49 between which the chains operate, said arms being carried on a laterally movable rod 50. A lever 51 is pivoted to a support 52 and to the rod 50 and may be manipulated to move said rod laterally which will result in flexing all of the chains 12 and cause them to assume different positions on the sprocket wheels 12 and 13. A latching segment 53 will hold the lever 51 in any desired adjustment. The rod 50 extends across all of the planting units or sections and is operable by a single lever to move all of the chains 12 at one operation.

The pivoted parts of the axles 4, on which the supporting wheels are mounted may be moved to change the adjustment of the wheels so as to change the direction of travel of the planter. This change of direction of travel may be effected without changing the parallel relation of transverse rows in which the grain is planted in "checking"; that is to say the grain planted while the machine moves in a direction which is oblique to its first direction of travel will be in transverse rows which are parallel to the transverse rows first planted. Each of the pivoted axle parts 4 is connected to a bell-crank lever 54 by a link 55, and said levers 54 are also pivoted to a laterally movable rod 56. Movement of the rod 56 in either lateral direction will move the pivoted axle parts 4 (Fig. 1). A lever 57 is pivoted to the support 52 and to the rod 56 and is operable to move said rod laterally. The hoes 27 are slidably mounted on arcuate portions of the frames 28, between the rings forming the wheels, so that when the wheels are swung laterally the hoes will also be moved and kept in position between the wheel rings (Fig. 3). The flexible tubes or passages 26 readily accommodate themselves to these adjustments, and the planting hoes may be moved to various operative positions with respect to the hoppers or boxes A from which they receive the seed grain.

As previously stated, a number of the planting units or sections may be detached from their operative connection, and may be entrained with the others for movement over roads, streets, bridges, etc. In the embodiment shown, in which there are five planting units or sections, one at each end is removable. Coupling devices are employed to connect the parts of the operating rods and shafts in these sections with the other parts of said rods and shafts in the central sections. One of these coupling devices is illustrated in Fig. 5, and comprises a sleeve 58 pinned to the end of each abutting rod or shaft and adapted to receive the end of the corresponding part of said rod or shaft. A latch part 59 on the said corresponding part of each rod or shaft engages in a hole in said sleeve and thereby couples the outer and inner sections of the various rods and shafts together so that the planting mechanism in all sections will be operated. The shaft 14, rod 18, rod 50 and rod 56, are each equipped with a coupling device, and are so coupled together. When the end sections are uncoupled from their operative positions they may be coupled together by their coupling devices, and entrained with the other sections by suitable connections 60 (Fig. 1) thereby putting the machine in condition and form for movement over highways, etc. Any suitable tongues, shafts, or other draft appliances may be used, and they may be connected to the machine in any suitable manner, such arrangement being within the skill of any person well informed in the use of agricultural appliances.

68 indicates a counter-balance weight one of which is pivotally supported on each of the arms 30. A pin or lug 69 on each of said arms 30 supports the counter-balance weight in either of two adjustments, as indicated in Fig. 2. When the weight 68 is in its forward adjustment as shown in solid lines in Fig. 2 it will actuate the arm 30 toward the wheel 25, so that the hook 36 on said arm 30 will be engaged by said wheel 25 in the manner and with result above described. This adjustment is maintained when the machine is to be used for "checking" purposes. By adjusting the weight 68 in its other position (shown in dotted lines in Fig. 2) it will actuate the arm 30 away from the wheel 25 so that the hook 36 will not be engaged by said wheel. This will permit the spring-frame 28 to remain permanently down. The seed will pass through the tube 26 in the usual way and be deposited in the ground as by the usual "drill" planters.

It will be understood, of course, that the springs 10 are released from compression so as to release the sprocket wheels 9 at each turning of the machine which permits the wheels 25 to remain stationary and support the spring-frames 28 when the machine is turning.

In using the machine for "checking" the rows only two of the arms 45 are employed and to actuate these arms to their normal position automatically when the clutch members 38 and 39 are thrown apart at each turning place, I provide a weight 70 (Fig. 2) in connection with the clutch member 38 carrying said arm. Since said clutch member 38 is loose on the shaft 14 the said weight 70 will, immediately upon breaking the clutch actuate the said loose clutch member 38 and hold the arms 45 in horizontal position. In starting on the return trip after turning the operator will operate the lever 40 effectively to move the rod 34 so as to actuate the levers 33 and release the spring-frame 28 at the proper time to plant in alinement with the first transverse row. The operator next engages the clutch member 39 with the member 38 and the machine thereafter operates automatically to perform its "checking" function. It will be observed that any one or more of the planting units or sections may be disabled and rendered inactive and inoperative by releasing the latch pawl 35 from the lever 33 while said lever 33 remains engaged with the hook 36 thereby supporting the planting hoe.

I am aware that there may be many variations from the specific construction and arrangement of parts shown and described without departure at all from the broad spirit and scope of the invention. It will be apparent that the self-contained "checking" mechanism constitutes an important part of the invention, and the embodiment illustrated and described will, as usual, suggest many alternative arrangements, which, I believe, it is unnecessary to illustrate and describe since I consider them embraced within the scope of the appended claims.

What I claim and desire to secure by Letters Patent of the United States is—

1. In a planter, a series of planting hoes, means for supporting said hoes, means for releasing said hoes, springs arranged to drive said hoes into the ground when said hoes are released, hoppers, flexible passages from said hoppers to said hoes, wheels arranged to pass over the planted seed effectively to compress the soil thereon, and means for setting said wheels to travel in different directions relative to the other parts of the planter, substantially as specified.

2. In a planter, an arcuate spring-impelled drag bar, a planting hoe slidably mounted on said drag bar, a hopper, a flexible passage from said hopper to said hoe, means for raising and holding said hoe, means for releasing said hoe, a wheel arranged to pass over the seed planted by said hoe effectively to compress the soil thereon, and means for adjusting said wheel at different angles effectively to position said hoe in different positions on said drag bar, substantially as specified.

3. In a planter, a planting hoe, a spring-impelled drag bar supporting and operating said hoe, a wheel operable to raise said hoe from the ground after each operation, means for upholding said hoe, a device for releasing said hoe, a hopper, a flexible passage from said hopper to said hoe, and a wheel arranged to compress the soil on the seed planted by said hoe, substantially as specified.

4. In a planter, a series of planting hoes, a spring-impelled drag bar supporting and operating each hoe to plant seed in the ground, a wheel operable to raise each hoe after each planting operation by said drag bars, levers arranged to support said hoes when they are raised by said wheels, means for operating said levers to release said hoes, hoppers, passages from said hoppers to said hoes, and wheels supporting all of said parts mentioned and arranged to pass over the planted seed to compress the soil thereon, substantially as specified.

5. In a planter, a number of spring-impelled drag bars, a planting hoe actuated by each drag bar to plant seed, a hopper arranged to deliver seed to each hoe, a wheel arranged to raise each of said hoes after each planting operation, a device arranged to support each hoe after being raised by said wheel, a rod for operating said devices, and means for operating said rod, substantially as specified.

6. In a planter, the combination with spring-impelled drag bars, a planting hoe on each drag bar, means for supplying seed to said hoes, and means for causing said drag bars to operate intermittently to plant seed at each operation, of wheels arranged to pass over the planted seed to compress the soil thereon, and means for changing said wheels to different angles to position said hoes in different positions on said drag bars, substantially as specified.

7. In a planter, planting hoes, a shaft, mechanism controlled by said shaft to drive said hoes intermittently into the ground in planting operations, supporting wheels arranged to pass over and to compress the soil on the planted seed, driving mechanism for said shaft, and means for operating said driving mechanism from said wheels, substantially as specified.

8. In a planter, planting hoes, a shaft, mechanism controlled by said shaft to drive said hoes intermittently into the ground in planting operations, supporting wheels arranged to pass over and to compress the soil on the planted seed, driving mechanism for said shaft, means for operating said driving mechanism from said wheels, and means for varying the speed of said hoes, substantially as specified.

9. A planter comprising a plurality of planting units, wheels supporting said units, seed-planting mechanism in each unit, separable couplings adjustable to hold all of said units in alined adjustment side by side or to permit detachment of certain of said units as desired, driving mechanism in said units for said planting mechanism, and means for operating said driving mechanism from said wheels, substantially as specified.

10. In a planter, the combination with a planting section arranged to support the operator or driver of the planter, seed-planting mechanism in said section, another planting section, seed planting mechanism in said second-named section, and wheels supporting said sections, of driving mechanism in each section for the seed-planting mechanism therein, means for operatively connecting the driving mechanism in one section with the driving mechanism in the other section, and independently releasable connections from said wheels to said driving mechanisms, respectively, for operating said seed planting mechanism in both of said sections, substantially as specified.

11. In a planter, the combination with a plurality of main planting sections arranged to support the operator or driver of the planter, seed-planting mechanism in each of said main sections, and a shaft for driving said planting mechanism, of an auxiliary section, seed-planting mechanism in said auxiliary section, releasable coupling devices whereby said auxiliary planting section may be connected at one side of said main planting sections, wheels for supporting said sections, mechanism driven by said wheels for operating said shaft, and means for driving the seed planting mechanism in said auxiliary section from said shaft, substantially as specified.

12. In a planter, seed-planting mechanism, wheels arranged to pass over and compress the soil on the planted seed, a shaft for operating said seed-planting mechanism, driving mechanism for said shaft, means for operating said driving mechanism from said wheels, a clutch controlling said operating means, means for operating said clutch to cause said wheels to operate said driving mechanism or not as desired, a hopper, and means for causing said hopper to discharge seed to said seed-planting mechanism or not, as desired, when said seed-planting mechanism is in operation, substantially as specified.

13. A machine for planting selected numbers of rows simultaneously, comprising a series of permanently connected planting units arranged to plant a number of parallel rows, seed-planting mechanism in each of said sections, and wheels supporting said units, in combination with other planting units, wheels supporting said second-named units, separable couplings adjustable to hold said second-named units side by side with said first-named units to plant rows parallel with the rows planted by said first-named units, seed-planting mechanism in each of said second-named units, a shaft for operating the seed-planting mechanism in all of said units, driving mechanism for said shaft, and means for operating said driving mechanism from said first-named wheels, substantially as specified.

14. In a planter, a plurality of separate planting units or sections, separable couplings adjustable to hold said units or sections in operative adjustment side by side, planting mechanism in each unit or section, wheels supporting said sections, operating mechanism for said planting mechanism, a shaft controlling said operating mechanism, driving mechanism for said shaft, means for operating said driving mechanism from said wheels, and means for varying the speed of operation of said planting mechanism, substantially as specified.

15. In a planter, an axle, a wheel on said axle, a shaft, means whereby said axle and wheel will rotate said shaft when the planter is in motion, a lever manipulative effectively to render said means operative or inoperative as desired, planting hoes supported independently of said wheel and controlled by said shaft, means for driving said planting hoes into the ground in intermittent operations, means for delivering seed to said hoes, and means for preventing operation of selected ones of said hoes, substantially as specified.

16. In a planter, an axle, a wheel on said axle, a shaft, connections whereby said axle and wheel will rotate said shaft when the planter is in motion, a lever manipulative effectively to render said connections operative or inoperative as desired, planting hoes supported independently of said wheel and controlled by said shaft, means for driving said planting hoes into the ground in intermittent operations, seed containers, means for causing said seed containers to deliver seed to said hoes or not as desired, and means for preventing operation of any selected ones of said hoes, substantially as specified.

17. In a planter, an axle, a wheel on said axle, a shaft, connections whereby said axle and wheel will rotate said shaft when the planter is in motion, means whereby said connections may be caused to vary the speed of rotation of said shaft, a lever manipulative effectively to render said connections operative or inoperative as desired, planting hoes supported independently of said wheel and controlled by said shaft, means for driving said planting hoes into the ground in intermittent operations, seed containers, means for causing said seed containers to deliver seed to said hoes or not as desired, and means for preventing operation of any selected ones of said hoes, substantially as specified.

18. In a planter, an axle, a wheel on said axle, a shaft, connections whereby said axle and wheel will rotate said shaft when the planter is in motion, means for varying the speed of rotation of said shaft while the planter is moving at uniform speed, a lever operable to render said connections operative or inoperative as desired, planting hoes supported independently of said shaft, means for driving said hoes into the ground in intermittent operations, means for preventing operation of any selected ones of said hoes, and means for delivering seed to said hoes, substantially as specified.

19. In a planter, the combination with a planting section arranged to support the operator or driver of the planter, a planting hoe in said section, another planting section, a planting hoe in said second-named section, and wheels supporting said sections, of driving mechanism in each section for the planting hoe therein, means for operatively connecting the driving mechanism in one section with the driving mechanism in the other section, and independently releasable connections from the wheels for operating said driving mechanism, respectively, substantially as specified.

In witness whereof I have signed this specification in the presence of two subscribing witnesses.

KNOWLES K. CARR.

Witnesses:
 FRANKLIN MILLER,
 J. D. RIPPEY.

---

Copies of this patent may be obtained for five cents each, by addressing the "Commissioner of Patents, Washington, D. C."